United States Patent
Hara et al.

(10) Patent No.: US 6,585,093 B2
(45) Date of Patent: Jul. 1, 2003

(54) DRIVE FORCE TRANSMISSION APPARATUS

(75) Inventors: Toshimi Hara, Aichi-ken (JP); Kunihiko Suzuki, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/053,546

(22) Filed: Jan. 24, 2002

(65) Prior Publication Data

US 2002/0121418 A1 Sep. 5, 2002

(30) Foreign Application Priority Data

Jan. 24, 2001 (JP) ........................ 2001-016175

(51) Int. Cl.$^7$ .................... F16D 27/15; F16D 27/14
(52) U.S. Cl. .................. 192/35; 192/48.2; 192/84.7; 192/84.91; 192/84.96
(58) Field of Search ............ 192/35, 48.2, 70.23, 192/84.7, 84.91, 84.96

(56) References Cited

U.S. PATENT DOCUMENTS

| | | | | |
|---|---|---|---|---|
| 5,735,375 A | * | 4/1998 | Booth et al. | 192/84.961 |
| 5,954,173 A | * | 9/1999 | Sakai et al. | 192/35 |
| 6,109,408 A | * | 8/2000 | Ikeda et al. | 192/35 |

* cited by examiner

Primary Examiner—Richard M. Lorence
(74) Attorney, Agent, or Firm—Oblon, Spivak, McClelland, Maier & Neustadt, P.C.

(57) ABSTRACT

A drive force transmission apparatus disposed within a differential carrier and adapted to drivingly couple first and second rotary shafts. The drive force transmission apparatus includes an outer casing coupled to the first rotary shaft, an inner shaft coupled to the second rotary shaft, a frictional clutch which enters a frictionally engaged state upon reception of a thrust force to thereby couple the outer casing and the inner shaft together, and an electromagnetic drive mechanism for generating the thrust force. The electromagnetic drive mechanism includes an electromagnet disposed outside the outer casing, a yoke supporting the electromagnet, the yoke being fixedly supported by the carrier in such a manner that the yoke faces a side wall of the outer casing with a gap formed therebetween, and a thrust force generation mechanism disposed inside the outer casing and adapted to produce the thrust force to be applied to the frictional clutch upon receipt of a magnetic force from the electromagnet via the gap and the side wall of the outer casing. A surface of the yoke and a surface of the side wall of the outer casing which face the gap each have a hardened surface layer.

20 Claims, 2 Drawing Sheets

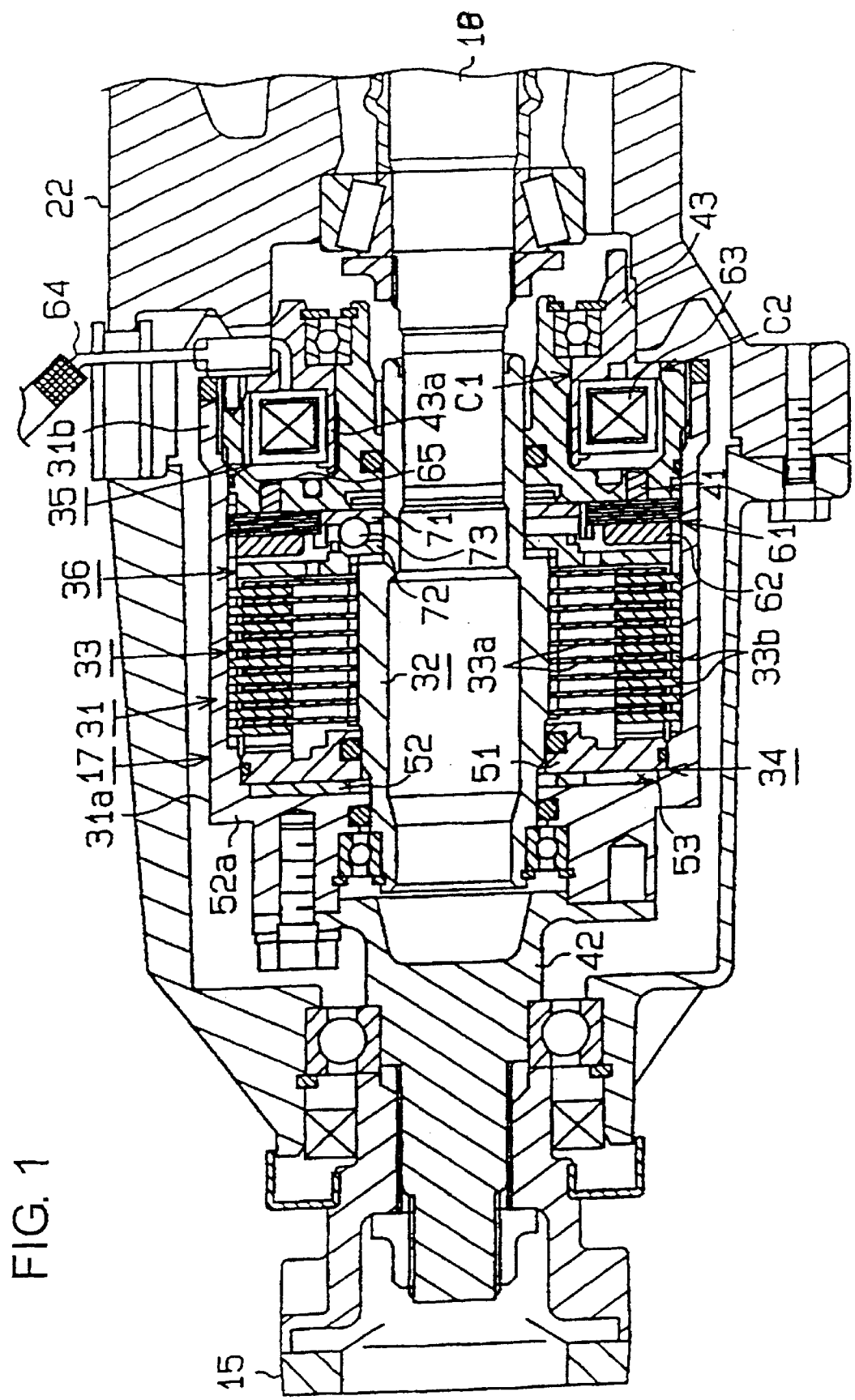

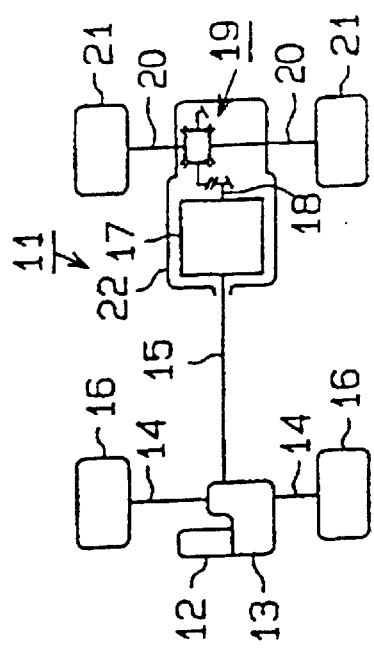
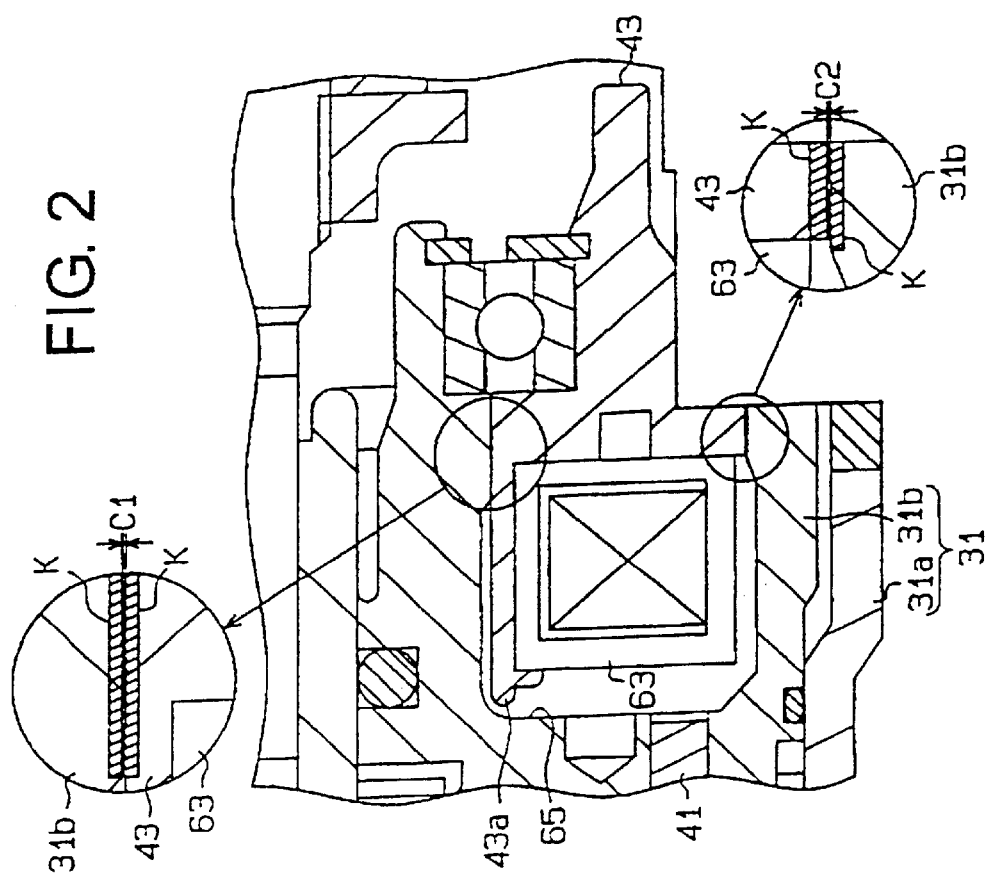

DRIVE FORCE TRANSMISSION APPARATUS

INCORPORATION BY REFERENCE

The present application claims priority under 35 U.S.C. §119 to Japanese Patent Application No. 2001-16175, filed on Jan. 24, 2001. The contents of that application are incorporated herein by reference in its entirety.

BACKGROUND OF THE INVENTION

1. Field of the Invention

The present invention relates to a drive force transmission apparatus disposed between a driving shaft and a driven shaft in a four-wheel-drive vehicle in order to transmit torque therebetween.

2. Description of the Related Art

There has been known a drive force transmission apparatus which has an annular frictional clutch provided between a front housing and a rear housing disposed to be coaxial with each other and rotatable relative to each other; and electromagnetic drive means which operates, upon being electrified, so as to bring the frictional clutch into a frictionally engaged state. The drive means includes an annular armature disposed on the inner side (front-end side) of the rear housing, and an annular electromagnet disposed on the outer side (rear-end side) of the rear housing. The electromagnet is fitted onto a tubular electromagnet support portion of a yoke to be accommodated within an annular recess formed in the outside wall of the rear housing. A predetermined inner gap is formed between the inner circumferential surface of the electromagnet support portion and the inner wall surface of the annular recess; and a predetermined outer gap is formed between the outer circumferential surface of the yoke and the outer wall surface of the annular recess.

Upon supply of electricity to the coil of the electromagnet, there is formed a closed magnetic path which passes through a portion of the yoke, the outer gap, an outer portion of the rear housing, a portion of the frictional clutch, the armature, a different portion of the friction clutch, an inner portion of the rear housing, the inner gap, and a different portion of the yoke. As a result, due to magnetic induction, the armature is moved toward the frictional clutch so as to press the frictional clutch, whereby the frictional clutch comes into a frictionally engaged state. By means of the thus-produced frictional engagement force, a main clutch mechanism is operated in order to couple the front housing and the rear housing in a torque transmissible manner.

The above-described conventional drive force transmission apparatus has the following drawback. In the drive force transmission apparatus, when electricity is supplied to the coil of the electromagnet, the rear housing and the yoke, both being formed of low-carbon steel (soft magnetic material of low carbon content), are magnetized to thereby serve as magnets. Therefore, if Fe-containing foreign matter (e.g., wear particles such as iron particles produced within a rear differential) enters the inner or outer gap, the foreign matter adheres to a surface of the rear housing and/or a surface of the yoke, which surfaces face the gap (hereinafter these surfaces will be referred to as "facing surfaces") and accumulate within the gap. In general, low-carbon steel is low in hardness, and therefore, when the front and rear housings rotate with foreign matter having entered the gap, the foreign matter wears or scratches the facing surfaces. As a result, wear particles are further generated and fill the gap, possibly resulting in the yoke and the rear housing becoming locked to each other due to seizure, thereby preventing rotation of a propeller shaft.

SUMMARY OF THE INVENTION

The present invention has been accomplished to solve the above-mentioned problems, and an object of the present invention is to provide a drive force transmission apparatus which has two members disposed with a gap formed therebetween to be rotatable relative to each other and which can mitigate wear and scratching of facing surfaces of the members, which wear and scratching would otherwise be caused by entrance of foreign matter into the gap.

The present invention provides a drive force transmission apparatus which includes a frictional clutch disposed between a first rotary member and a second rotary member disposed to be rotatable relative to each other; an electromagnetic drive mechanism for bringing the frictional clutch into a frictionally engaged state, upon reception of electricity, in order to couple the first and second rotary members in a torque transmissible manner; and a facing member disposed to be rotatable relative to the first rotary member with a gap formed therebetween, wherein a surface of the first rotary member and a surface of the facing member which face the gap each have a hardened surface layer.

Since a hardened surface layer is formed on the surfaces which face the gap, wear and scratching of the surfaces by foreign matter having entered the gap can be mitigated.

The drive mechanism may include an armature disposed within the first rotary member to face the frictional clutch and an electromagnet disposed outside the first rotary member to face the frictional clutch via a side wall of the first rotary member present between the frictional clutch and the electromagnet; and the facing member may support the electromagnet and may be disposed to form first and second gaps between the facing member and the side wall of the first rotary member at different positions with respect to the radial direction of the first rotary member.

Preferably, the hardened surface layer is formed by quenching, soft-nitriding, or plating.

The present invention provides another drive force transmission apparatus disposed within a carrier fixed to a vehicle body and adapted to drivingly couple first and second rotary shafts rotatably supported by the carrier, the drive force transmission apparatus which includes an outer casing coupled to the first rotary shaft, the outer casing being rotatable relative to the carrier; an inner shaft coupled to the second rotary shaft, the inner shaft being disposed coaxially with the outer casing and being rotatable relative to the carrier and the outer casing; a frictional clutch disposed in an annular space defined by the outer casing and the inner shaft, the frictional clutch entering a frictionally engaged state upon reception of a thrust force in order to couple the outer casing and the inner shaft together; and an electromagnetic drive mechanism disposed on one side of the frictional clutch with respect to the axial direction of the inner shaft, the electromagnetic drive mechanism including an electromagnet disposed outside the outer casing, a yoke supporting the electromagnet, the yoke being fixedly supported by the carrier in such a manner that the yoke faces a side wall of the outer casing with a gap formed therebetween, and a thrust force generation mechanism disposed inside the outer casing and adapted to produce the thrust force to be applied to the frictional clutch upon receipt of a magnetic force from the electromagnet via the gap and the side wall of the outer casing, wherein a surface of the yoke and a surface of the side wall of the outer casing which face the gap each have a hardened surface layer.

The electromagnet and the yoke may be received in an annular recess formed in the side wall of the outer casing, so that first and second gaps are formed between the yoke and the side wall of the outer casing at different radial positions.

The thrust force generation mechanism may include a cam mechanism disposed inside the outer casing to be located between the frictional clutch and the side wall, the cam mechanism including at least first and second cam members and generating the thrust force when the first cam member is rotated relative to the second cam member, the second cam member being fixed to the inner shaft; a second annular frictional clutch disposed inside the outer casing to be located adjacent to the side wall and adapted to drivingly couple the first cam member to the outer casing upon reception of a thrust force; and an annular armature disposed inside the outer casing in such a manner that the second frictional clutch is sandwiched between the armature and the side wall of the outer casing, the armature receiving a magnetic force from the electromagnet to apply a thrust force to the second frictional clutch to thereby bring the second frictional clutch in a frictionally engaged state.

Preferably, the hardened surface layer is formed by quenching, soft-nitriding, or plating.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 is a sectional view of a drive force transmission apparatus according to an embodiment of the present invention;

FIG. 2 is an enlarged sectional view of a main portion of the drive force transmission apparatus shown in FIG. 1; and FIG. 3 is a schematic diagram of a four-wheel-drive vehicle which includes the drive force transmission apparatus shown in FIG. 1.

DESCRIPTION OF THE PREFERRED EMBODIMENT

An embodiment of the present invention will now be described in detail with reference to the drawings. In the present embodiment, the present invention is applied to a drive force transmission apparatus which is disposed in a drive force transmission path for transmitting drive force to rear wheels of a four-wheel-drive vehicle which in an ordinary state behaves as a front-wheel drive vehicle.

Overall Structure

As shown in FIG. 3, a four-wheel-drive vehicle 11 includes an engine 12 and a transaxle 13. A pair of front axles 14 and a propeller shaft 15 are coupled to the transaxle 13. Front wheels 16 are coupled to the corresponding front axles 14. A drive force transmission apparatus 17 is coupled to the propeller shaft 15. A rear differential 19 is coupled to the drive force transmission apparatus 17 via a drive pinion shaft 18. Rear wheels 21 are coupled to the rear differential 19 via a pair of rear axles 20. The drive force transmission apparatus 17, the drive pinion shaft 18, and the rear differential 19 are accommodated within a differential carrier 22, and are supported by the vehicle body via the differential carrier 22. Differential oil is stored in the differential carrier 22.

Drive force of the engine 12 is transmitted to the front wheels 16 via the transaxle 13 and the front axles 14. When the propeller shaft 15 is coupled to the drive pinion shaft 18 in a torque transmissible manner by means of the drive force transmission apparatus 17, the drive force of the engine 12 is transmitted to the rear wheels 21 via the propeller shaft 15, the drive pinion shaft 18, the rear differential 19, and the rear axles 20.

Drive Force Transmission Apparatus

As shown in FIG. 1, the drive force transmission apparatus 17 includes an outer casing 31, which accommodates an inner shaft 32, a main clutch mechanism 33, a pressing-force generation mechanism 34, a pilot clutch mechanism 35, and a cam mechanism 36.

Outer Casing

The outer casing 31 includes a bottomed cylindrical front housing 31a having an open end portion, and a rear housing 31b screwed into the open end portion of the front housing 31a. The front housing 31a is formed of aluminum alloy, which is a non-magnetic material, and the rear housing 31b is formed of low-carbon steel, which is a soft magnetic material. A hollow cylindrical member 41 formed of stainless steel, which is a non-magnetic material, is embedded in a radially intermediate portion of the rear housing 31b.

Inner Shaft

One end portion (the left-side end portion in FIG. 1) of the inner shaft 32 is inserted into the interior of the front housing 31a with the other end (right-side end portion in FIG. 1) of the inner shaft 32 penetrating a center portion of the rear housing 31b in a fluid-tight manner. The inner shaft 32 is rotatably supported by the front housing 31a and the rear housing 31b such that axial movement of the inner shaft 32 is restricted. One end of the drive pinion shaft 18 is spline-engaged with the other end (right-side end portion in FIG. 1) of the inner shaft 32.

Input Shaft

A flange-shaped base end portion of an input shaft 42 is fixed to a front end portion (left-side end portion in FIG. 1) of the front housing 31a for unitary rotation. The input shaft 42 is rotatably supported by a front end portion of the differential carrier 22 via a bearing. A tip end portion of the input shaft 42 is connected to the above-described propeller shaft 15. Meanwhile, the rear housing 31b is supported, at its outer circumferential surface, by a yoke 43 via a bearing. The yoke 43 is fixedly disposed within the differential carrier 22. The yoke 43 is also formed of low-carbon steel similar to that of the rear housing 31b.

Main Clutch Mechanism

The main clutch mechanism 33 is disposed at the front end side of the interior space of the front housing 31a and is constituted by a wet-type frictional multiple-disc clutch including a number of inner clutch plates 33a and outer clutch plates 33b. The inner clutch plates 33a are each spline-engaged with the outer circumferential surface of the inner shaft 32 in an axially movable manner. The outer clutch plates 33b are each spline-engaged with the inner circumferential surface of the front housing 31a in an axially movable manner. The inner clutch plates 33a and the outer clutch plates 33b are disposed alternately. The inner clutch plates 33a and the outer clutch plates 33b are caused to abut each other for frictional engagement or to separate from each other for disengagement; i.e., for attaining the free state.

Pressing-Force Generation Mechanism

The pressing-force generation mechanism 34 is disposed in the interior space of the front housing 31a to be located on the front side of the main clutch mechanism 33. The pressing-force generation mechanism 34 includes an operating piston 51, a rotor 52, and a fluid chamber 53.

Operating Piston

The operating piston 51 is disposed to surround the inner shaft 32 in a fluid-tight manner such that the operating piston 51 is rotatable and axially movable relative to the inner shaft 32. The outer circumference surface of the operating piston 51 maintains contact with the inner circumferential surface of the front housing 31a in a fluid-tight manner such that the operating piston 51 is rotatable and axially movable relative to the front housing 31a.

Fluid Chamber

The fluid chamber 53 is a space surrounded by the inner circumferential surface (including the bottom surface) of the front housing 31a, the front end face of the operating piston 51, and the outer circumferential surface of the inner shaft 32. The fluid chamber 53 is filled with a highly viscous fluid such as silicon oil.

Rotor

The rotor 52 is accommodated within the fluid chamber 53 and fixed to the outer circumferential surface of the inner shaft 32 in such a manner that that the rotor 52 rotates together with the inner shaft 32. The rotor 52 has a plurality of radially extending vanes 52a, which divide the fluid chamber 53 into two reservoir spaces.

Pilot Clutch Mechanism

The pilot clutch mechanism 35 is disposed at the rear end (right-side end in FIG. 1) of the outer casing 31. The pilot clutch mechanism 35 includes a frictional clutch 61, an armature 62, and an electromagnet 63. The armature 62 is located between the frictional clutch 61 and a second cam member 72, which constitutes the cam mechanism 36 in cooperation with a first cam member 71, which will be described later. The electromagnet 63 is disposed on the rear side of the frictional clutch 61. One end of a lead wire 64 is connected to the electromagnet 63, and the other end of the lead wire 64 is connected to a battery (not shown) via an unillustrated switch.

Frictional Clutch

The frictional clutch 61 is constituted by a wet-type frictional multiple-disc clutch including a number of inner clutch plates and outer clutch plates. The inner clutch plates are each spline-engaged with the outer circumferential surface of the first cam member 71 of the cam mechanism 36 in an axially movable manner. The outer clutch plates are each spline-engaged with the inner circumferential surface of the front housing 31a in an axially movable manner. The inner clutch plates and the outer clutch plates are disposed alternately. The inner clutch plates and the outer clutch plates are caused to abut each other for frictional engagement or to separate from each other for disengagement; i.e., for attaining the free state.

Armature

The armature 62 assumes an annular shape and is spline-engaged with the inner circumferential surface of the front housing 31a. Therefore, the armature 62 can be moved along the center axis of the outer casing 31 and can be rotated together with the same.

Electromagnet

As shown in FIGS. 1 and 2, the electromagnet 63 assumes an annular shape and is accommodated within an annular recess 65 formed in the rear end face of the rear housing 31b while being fitted onto a tubular electromagnet support portion 43a of the yoke 43. A predetermined inner gap C1 is formed between the inner circumferential surface of the electromagnet support portion 43a and the inner wall surface (located radially inward) of the annular recess 65; and a predetermined outer gap C2 is formed between an outer circumferential surface of the yoke 43 and an outer wall surface (located radially outward) of the annular recess 65. The yoke 43 is rotatably supported by the inner wall surface (located radially inward) of the annular recess 65 via a bearing. The rear end of the yoke 43 is fitted into a cylindrical bore formed in the inner wall of the differential carrier 22.

Upon supply of electricity to the coil of the electromagnet 63, there is formed a closed magnetic path which passes through a portion of the yoke 43, the gap C1, a portion of the rear housing 31b, a portion of the frictional clutch 61, the armature 62, a different portion of the friction clutch 61, a different portion of the rear housing 31b, the gap C2, and a different portion of the yoke 43. As a result, due to magnetic induction, the armature 62 is moved toward the electromagnet 63 so as to press the frictional clutch 61, whereby the frictional clutch 61 comes into a frictionally engaged state.

Cam Mechanism

The cam mechanism 36 includes the first cam member 71 having an annular shape, the second cam member 72 having an annular shape, and spherical cam elements 73. A plurality of cam grooves are formed, at predetermined circumferential intervals, on end surfaces of the cam members 71 and 72 which face each other. The cam elements 73 are held between the corresponding opposed cam grooves of the cam members 71 and 72.

The first cam member 71 is rotatably fitted onto the inner shaft 32 and maintains contact with the front end surface of the rear housing 31b via a bearing. The second cam member 72 is spline-engaged with the outer circumferential surface of the inner shaft 32, so that the second cam member 72 can move axially relative to the inner shaft 32. The second cam member 72 is disposed to face the outermost inner clutch plate 33a of the main clutch mechanism 33.

When the frictional clutch 61 of the pilot clutch mechanism 35 is in a disengaged state, the first cam member 71 is maintained in a free state. When the frictional clutch 61 is brought into a frictionally engaged state, the first cam member 71 is drivingly coupled to the outer casing 31. Thus, a relative rotation is produced between the first cam member 71 and the second cam member 72, and the first cam member 71 pushes the second cam member 72, via the cam elements 73, toward the main clutch mechanism 33. As a result, the main clutch mechanism 33 is brought into a frictionally engaged state.

That is, when the coil of the electromagnet 63 of the pilot clutch mechanism 35 is not electrified, the frictional clutch 61 and the armature 62 are freely rotatable, so that the first and second cam members 71 and 72 are maintained in a condition such that the first and second cam members 71 and 72 and the cam elements 73 can rotate together with the input shaft 32, and the friction clutch 61 and the cam mechanism 36 do not provide their intended functions.

Hardened Layers

As shown in FIG. 2, a hardened layer (nitrided layer) K of predetermined thickness is formed on each of the facing surfaces of the rear housing 31b and the yoke 43, which face the gaps C1 and C2, by means of soft-nitriding treatment (gas soft-nitriding treatment). The thickness (or hardening depth) of the hardened layer K is a thickness as measured at a relevant portion of the facing surfaces of the rear housing 31b and the yoke 43 in a direction perpendicular to the corresponding surface.

The thickness (or hardening depth) and area of the hardened layer K are set in such a manner that the formation of the hardened layer K does not greatly deteriorate the magnetic properties of the rear housing 31b and the yoke 43. Therefore, when either of the rear housing 31b and the yoke 43 is considered as a whole, magnetic permeability higher than a predetermined value can be attained, and coercive force can be suppressed to a level less than a predetermined value. The hardened layer K has a hardness greater than that of non-hardened layer, and therefore has excellent wear resistance.

Soft-Nitriding Treatment

In the present embodiment, the rear housing 31b and the yoke 43 are each formed of low-carbon steel (carbon content: 0.08% to 0.8%; e.g., S35C, S10C), which is lower in magnetic resistance than high-carbon steel (carbon content: 0.8% to 1.6%). First, the rear housing 31b and the yoke 43 are placed in a sealed casing and heated to 500 to 600° C., and then ammonia gas is supplied to the casing. As a result, nitrogen is introduced into the surfaces of the rear housing 31b and the yoke 43, and iron nitride (FeN) is produced there. Thus, the hardened layer (nitrided layer) K is formed. Subsequently, the hardened layer K is removed, through cutting, from the surfaces of the rear housing 31b and the yoke 43, other than their facing surfaces which are to face the gaps C1 and C2. In this manner, the facing surfaces of the rear housing 31b and the yoke 43 are hardened.

Notably, the outer casing 31 corresponds to a first rotary member in the claims; the rear housing 31b corresponds to a side wall of the first rotary member; and the inner shaft 32 corresponds to a second rotary member in the claims. Further, the yoke 43 corresponds to a facing member in the claims, which is disposed to be rotatable relative to the outer casing 31 with a predetermined gap formed therebetween; and the armature 62 and the electromagnet 63 correspond to an electromagnetic drive mechanism in the claims, which operates, upon supply of electricity thereto, in order to bring the frictional clutch 61 into a frictionally engaged state. The cam mechanism 36, the frictional clutch 61, and the armature 62 correspond to a thrust force generation mechanism in the claims.

Operation of the Embodiment

Next, operation of the drive force transmission apparatus during traveling of the vehicle 11 will be described.

Real-time Four-Wheel Drive

In an ordinary state, no electricity is supplied to the coil of the electromagnet 63, in order to maintain the drive system in a real-time four-wheel drive mode. In such a case, the drive force transmission apparatus operates as follows. When a relative rotation is generated between the outer casing 31 and the inner shaft 32 due to generation of a rotational-speed difference between the propeller shaft 15 and the drive pinion shaft 18, the rotor 52 rotates within the fluid chamber 53 relative to the outer casing 31. As a result, a pressing force corresponding to the rotational-speed difference between the propeller shaft 15 and the drive pinion shaft 18 is generated within the fluid chamber 53. This pressing force moves the operating piston 51 toward the main clutch mechanism 33. Thus, the inner and outer clutch plates of the main clutch mechanism 33 engage each other with a friction force corresponding to the pressing force which is transmitted to the main clutch mechanism 33 via the operating piston 51.

As a result, the propeller shaft 15 is connected to the drive pinion shaft 18 via the outer casing 31, the main clutch mechanism 33, and the inner shaft 32. Thus, a torque corresponding to the rotational-speed difference between the propeller shaft 15 and the drive pinion shaft 18 is transmitted from the propeller shaft 15 to the drive pinion shaft 18, so that the vehicle 11 comes into a real-time four-wheel drive mode.

Direct-Coupled Four-Wheel Drive

When a driver wishes to change the mode of the drive system from the above-described real-time four-wheel drive mode to direct-coupled four-wheel drive, he or she operates the above-described switch, which is provided in the vicinity of the driver's seat, to thereby supply electricity to the coil of the electromagnet 63. As a result, due to electromagnetic induction, the armature 62 is moved toward the electromagnet 63, whereby the frictional clutch 61 comes into a frictionally engaged state, and thus the first cam member 71 is drivingly coupled to the outer casing 31. As a result, a relative rotation is produced between the first cam member 71 and the second cam member 72, and the pilot clutch mechanism 35 functions effectively.

Therefore, when a relative rotation is generated between the outer casing 31 and the inner shaft 32 due to generation of a rotational-speed difference between the propeller shaft 15 and the drive pinion shaft 18, in response to a pressing force generated by the cam mechanism 36, the inner and outer clutch plates of the main clutch mechanism 33 strongly engage each other and come into a completely coupled state. In other words, the vehicle 11 comes into a directly-coupled four-wheel drive mode.

As shown in FIG. 2, the facing surfaces of the outer casing 31 and the yoke 43 have sufficiently high hardness to prevent surface biting of Fe-containing foreign matter (e.g., wear particles such as iron particles produced at the rear differential 19) which may enter the gaps C1 and C2. Therefore, even when foreign matter enters the gaps C1 and C2 while the vehicle 11 travels, the foreign matter hardly bites into the facing surfaces. Therefore, the facing surfaces are neither worn away nor scratched, and thus further generation of wear particles can be suppressed. Accordingly, clogging of the gaps C1 and C2 and seizure between the rear housing 31b and the yoke 43, among other problems, can be avoided.

Since the hardened layer K is non-magnetic, even when the electromagnet 63 is electrified, Fe-containing foreign matter is not pulled into the gaps C1 and C2 under magnetic force. Further, since the facing surfaces of the rear housing 31b and the yoke 43 are not magnetized, even if Fe-containing foreign matter enters the gaps C1 and C2, the foreign matter is not magnetically attracted to the facing surfaces, and therefore the foreign matter does not accumulate within the gaps C1 and C2. Moreover, when a relative rotation of the housings 31a and 31b is produced, the foreign matter within the gaps C1 and C2 is hit back by the facing surfaces, rather than biting into the facing surfaces.

The above-described embodiment may be modified as follows.

In the present embodiment, the hardened layer (nitrided layer) K is formed through soft-nitriding treatment However, a hardened layer (carburized layer) K may be formed by means of carburizing and quenching. Carburizing and quenching is a surface hardening method in which carbon is introduced into a surface of a workpiece in order to increase the carbon content at the surface, and then quenching is performed in order to harden the surface. Carburizing may be limited to the facing surfaces. Alternatively, the entire surfaces of the rear housing 31b and the yoke 43 may be subjected to carburizing, after which surface portions other than the facing surfaces are removed through cutting.

The surface hardening may be performed by means of surface quenching such as flame quenching and high-frequency induction quenching. These methods rapidly increase the temperature of the surface of steel, which can be hardened by quenching, to a predetermined quenching temperature range and then cool the surface for quenching.

The hardened layer K may be formed through plating. In such a case, hard chrome plating is preferred. Hard chromium plating is performed under predetermined conditions without formation of an undercoat. In such a case, since the hardened layer K is non-magnetic, the problem of Fe-containing foreign matter being attracted into the gaps C1 and C2 upon electrification of the electromagnet 63 can be avoided. Even when foreign matter enters the gaps C1 and C2, the foreign matter does not adhere to the facing surfaces.

The facing surfaces of the rear housing 31b and the yoke 43 may be hardened by means of shot peening. Shot peening is a method in which steel balls are jetted against a surface of a steel member at high speed to thereby harden the surface.

The differential carrier 22 may be omitted.

The differential oil may be omitted.

The pressing-force generation mechanism 34 may be omitted. In this case, the main clutch mechanism 33 is operated by only the pressing force generated upon operation of the pilot clutch mechanism (electromagnetic clutch) 35.

In the present embodiment, the drive force transmission apparatus 17 is used for transmission of drive force between the propeller shaft 15 and the drive pinion shaft 18. However, the drive force transmission apparatus 17 may be used as a drive force transmission apparatus for a transmission, a transfer, or a center differential, among others.

In the present embodiment, the hardened surface K is formed on the facing surfaces of the rear housing 31b and the yoke 43. However, the hardened surface K may be formed on the entire surfaces (including the facing surfaces) of the rear housing 31b and the yoke 43. In other words, the process of removing the hardened surface K from surface portions other than the facing surfaces, which is performed after nitriding of the rear housing 31b and the yoke 43, may be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive force transmission apparatus comprising:
    a frictional clutch disposed between a first rotary member and a second rotary member disposed to be rotatable relative to each other;
    an electromagnetic drive mechanism for bringing said frictional clutch into a frictionally engaged state, upon reception of electricity, in order to couple said first and second rotary members in a torque transmissible manner; and
    a facing member disposed to be rotatable relative to said first rotary member with a gap formed therebetween, wherein
        a surface of said first rotary member and a surface of said facing member which face the gap each have a hardened surface layer.

2. A drive force transmission apparatus according to claim 1, wherein said hardened surface layer is formed by quenching.

3. A drive force transmission apparatus according to claim 1, wherein said hardened surface layer is formed by soft-nitriding.

4. A drive force transmission apparatus according to claim 1, wherein said hardened surface layer is formed by plating.

5. A drive force transmission apparatus according to claim 1, wherein said drive mechanism includes an armature disposed within said first rotary member to face said frictional clutch and an electromagnet disposed outside said first rotary member to face said frictional clutch via a side wall of said first rotary member present between said frictional clutch and said electromagnet; and
    said facing member supports said electromagnet and is disposed to form first and second gaps between said facing member and the side wall of said first rotary member at different positions with respect to the radial direction of said first rotary member.

6. A drive force transmission apparatus according to claim 5, wherein said hardened surface layer is formed by quenching.

7. A drive force transmission apparatus according to claim 5, wherein said hardened surface layer is formed by soft-nitriding.

8. A drive force transmission apparatus according to claim 5, wherein said hardened surface layer is formed by plating.

9. A drive force transmission apparatus disposed within a carrier fixed to a vehicle body and adapted to drivingly couple first and second rotary shafts rotatably supported by said carrier, said drive force transmission apparatus comprising:
    an outer casing coupled to said first rotary shaft, said outer casing being rotatable relative to said carrier;
    an inner shaft coupled to said second rotary shaft, said inner shaft being disposed coaxially with said outer casing and being rotatable relative to said carrier and said outer casing;
    a frictional clutch disposed in an annular space defined by said outer casing and said inner shaft, said frictional clutch entering a frictionally engaged state upon reception of a thrust force in order to couple said outer casing and said inner shaft together; and
    an electromagnetic drive mechanism disposed on one side of said frictional clutch with respect to the axial direction of said inner shaft, said electromagnetic drive mechanism including an electromagnet disposed outside said outer casing, a yoke supporting said electromagnet, said yoke being fixedly supported by said carrier in such a manner that said yoke faces a side wall of said outer casing with a gap formed therebetween, and a thrust force generation mechanism disposed inside said outer casing and adapted to produce the thrust force to be applied to said frictional clutch upon receipt of a magnetic force from said electromagnet via the gap and the side wall of said outer casing, wherein
        a surface of said yoke and a surface of the side wall of said outer casing which face the gap each have a hardened surface layer.

10. A drive force transmission apparatus according to claim 9, wherein said hardened surface layer is formed by quenching.

11. A drive force transmission apparatus according to claim 9, wherein said hardened surface layer is formed by soft-nitriding.

12. A drive force transmission apparatus according to claim 9, wherein said hardened surface layer is formed by plating.

13. A drive force transmission apparatus according to claim 9, wherein said electromagnet and said yoke is received in an annular recess formed in the side wall of said outer casing, so that first and second gaps are formed between said yoke and the side wall of said outer casing at different radial positions.

14. A drive force transmission apparatus according to claim 13, wherein said hardened surface layer is formed by quenching.

15. A drive force transmission apparatus according to claim 13, wherein said hardened surface layer is formed by soft-nitriding.

16. A drive force transmission apparatus according to claim 13, wherein said hardened surface layer is formed by plating.

17. A drive force transmission apparatus according to claim 9, wherein said thrust force generation mechanism includes:

a cam mechanism disposed inside said outer casing to be located between said frictional clutch and the side wall, said cam mechanism including at least first and second cam members and generating the thrust force when said first cam member is rotated relative to said second cam member, said second cam member being fixed to said inner shaft;

a second annular frictional clutch disposed inside said outer casing to be located adjacent to the side wall and adapted to drivingly couple said first cam member to said outer casing upon reception of a thrust force; and an annular armature disposed inside said outer casing in such a manner that said second frictional clutch is sandwiched between said armature and the side wall of said outer casing, said armature a receiving magnetic force from said electromagnet to apply a thrust force to said second frictional clutch to thereby bring said second frictional clutch in a frictionally engaged state.

18. A drive force transmission apparatus according to claim 17, wherein said hardened surface layer is formed by quenching.

19. A drive force transmission apparatus according to claim 17, wherein said hardened surface layer is formed by soft-nitriding.

20. A drive force transmission apparatus according to claim 17, wherein said hardened surface layer is formed by plating.

* * * * *